March 27, 1956     J. N. FELGER     2,739,876
MIXER REACTION APPARATUS
Filed Aug. 18, 1953
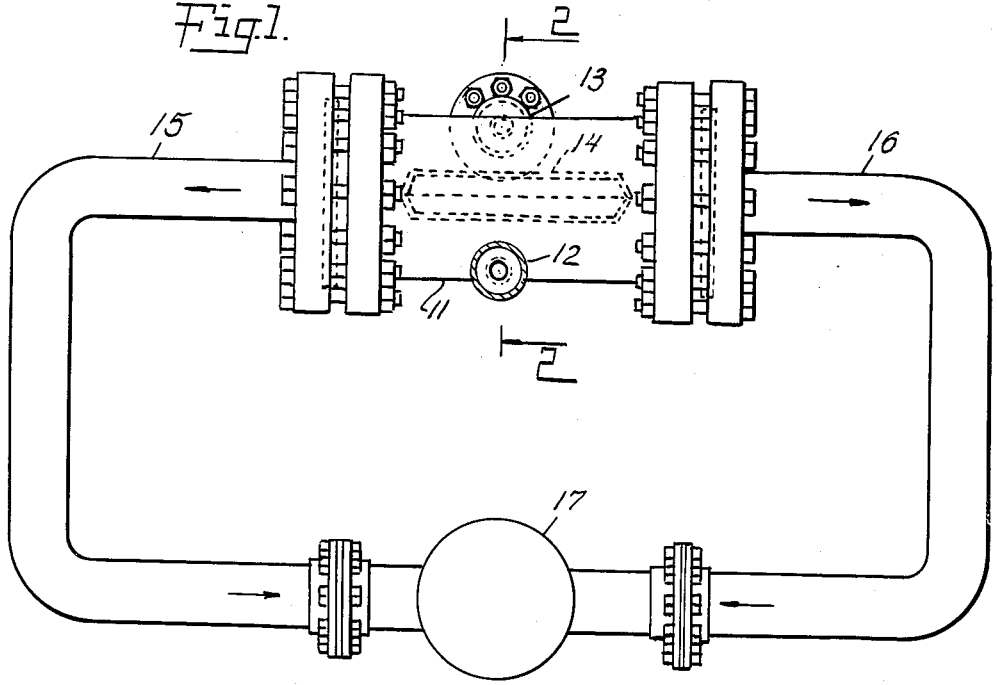
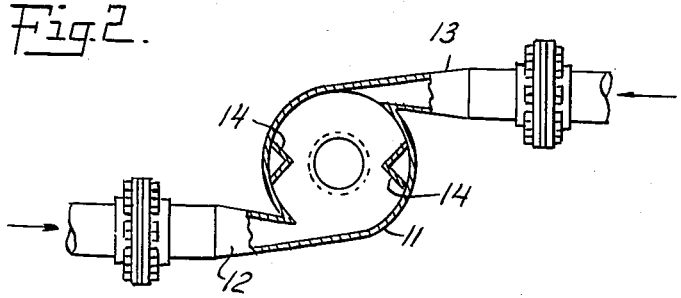
INVENTOR
JAMES N. FELGER
BY
Adams, Forward and McLean
ATTORNEYS United States Patent Office 2,739,876
Patented Mar. 27, 1956

2,739,876

MIXER REACTION APPARATUS

James N. Felger, Kenmore, N. Y., assignor to Olin Mathieson Chemical Corporation, a corporation of Virginia Application August 18, 1953, Serial No. 375,026

1 Claim. (Cl. 23—252)

My invention relates to an improved apparatus suitable for use in the manufacture of hydrazine by the Raschig synthesis. More particularly, my invention relates to an improved means for the preparation of aqueous chloroamine solution which is a principal reactant in the process.

In the Raschig process for the synthesis of hydrazine an aqueous chloroamine solution is prepared by the low temperature reaction of aqueous hypochlorite solution with aqueous ammonia as a first step. The chloroamine solution is subsequently treated with a large excess of ammonia in order to form hydrazine. One of the difficulties in manufacturing hydrazine commercially is that of avoiding losses of the unstable chloroamine by decomposition or side reactions. It is important to combine the chloroamine solution as quickly as possible with a large excess of ammonia in the synthesis stage in order to obtain the best yield. The apparatus of my invention is particularly useful for producing relatively high concentrations of chloroamine in good yield and permits the transfer of the solution quickly to the synthesis stage.

The chloroamine reactor of my invention comprises a relatively short open-ended cylindrical reaction chamber into which the aqueous hypochlorite solution and aqueous ammonia are introduced tangentially near the center. The open ends communicate directly with the reaction chamber in which the second step of the process is carried out. The inner surface of the chloroamine reactor is lined with a plurality of longitudinal ribs or baffles in order to provide violent agitation and instantaneous reaction to form chloroamine.

The construction of my chloroamine reactor and its operation will be further described with reference to the accompanying drawings, in which:

Figure 1 represents a plan of the apparatus; and

Figure 2 represents a section through the apparatus along the line 2—2 of Figure 1.

The cylinder 11 is provided with tangentially arranged tubulatures 12 and 13 through which sodium hypochlorite solution and aqueous ammonia are introduced at high speed. The incoming streams are violently admixed by ribs 14 and the chloroamine solution leaves the reactor as rapidly as produced by exit tubes 15 and 16. The latter are as short as conveniently possible and are brought around to a common header 17 enclosing the reaction chamber for the second step of the Raschig process.

The reactor is simple and therefore readily removed and cleaned. Tantalum is preferably used for the hypochlorite inlet line but Hastelloy alloy C and AISI 316 stainless steel are also suitable. Other parts of the apparatus in contact with the reaction mixture are preferably fabricated of AISI 316 stainless steel. Stabilized stainless steel containing columbium or titanium can be used also.

The reaction temperature is maintained between about $-5°$ and $+5°$ C. by precooling of the reactants before introduction into the apparatus. In this way thermal decomposition of chloroamine is minimized.

My invention thus provides a chloroamine reactor characterized by a construction which insures violent agitation of the reactants, adequate temperature control and immediate transfer of the chloroamine solution to the next step of the process with the minimum possibility of decomposition and side reactions. The apparatus is especially suited to handle approximately equal volumes of aqueous reactants. Because of this construction, more concentrated chloroamine solutions can be prepared and utilized to obtain hydrazine in improved yields. Thus the aqueous ammonia can have a concentration of as high as 20% and the hypochlorite concentration can be up to about 140 grams per liter of available chlorine whereas in conventional equipment the use of hypochlorite concentrations over about 70 grams of available chlorine per liter leads to excessive losses. This results in substantial increases in production capacity due to reduced loads on the evaporator and liquor handling in the synthesis step and in recovery.

The apparatus of my invention is especially advantageous for use in conjunction with the Venturi-type mixer described in my copending application serial No. 374,913, filed of even date herewith, entitled "Mixer."

I claim:

An apparatus suitable for use in the manufacture of an aqueous solution of chloroamine by reacting an aqueous hypochlorite solution and aqueous ammonia which comprises a cylindrical reaction chamber having means located at each end of the cylinder for discharging reaction products along the longitudinal axis of the cylinder, two reactant feed conduits centrally located with respect to the longitudinal axis of the cylinder and positioned substantially opposite each other with respect to the surface of the cylinder and in substantially tangential communication with the surface of the cylinder, the conduits having restricted cross-sectional areas at their respective points of juncture with the cylinder and pointing in opposite directions with respect to a plane which passes through the longitudinal axis of the cylinder and is substantially normal to the surface of the cylinder at the points of juncture between the conduits and cylinder, and baffles having longitudinal axes substantially parallel to the longitudinal axis of the cylinder, in communication with the inner surface of the cylinder and extending along their longitudinal axes for substantially the length of the cylinder whereby there is violent agitation and mixing of the aqueous hypochlorite solution and aqueous ammonia entering through the feed conduits resulting in instantaneous formation and rapid removal of chloroamine from the reaction chamber.

References Cited in the file of this patent

UNITED STATES PATENTS

| 2,205,986 | Mangelsdorf et al. | June 25, 1940 |
| 2,653,801 | Fontein et al. | Sept. 29, 1953 |